United States Patent
Alderson et al.

(10) Patent No.: US 10,356,126 B2
(45) Date of Patent: Jul. 16, 2019

(54) COMMUNICATION BETWEEN FRAMES OF A WEB BROWSER

(71) Applicant: Livestax Limited, Buckinghamshire (GB)

(72) Inventors: Ross Alderson, Warwickshire (GB); Philip Brown, Buckinghamshire (GB)

(73) Assignee: Livestax Limited, Buckinghamshire (GB)

( * ) Notice: Subject to any disclaimer, the term of this patent is extended or adjusted under 35 U.S.C. 154(b) by 750 days.

(21) Appl. No.: 14/725,881

(22) Filed: May 29, 2015

(65) Prior Publication Data
US 2015/0350253 A1 Dec. 3, 2015

(30) Foreign Application Priority Data
May 29, 2014 (GB) .................................. 1409542.6

(51) Int. Cl.
| | |
|---|---|
| G06F 15/16 | (2006.01) |
| H04L 29/06 | (2006.01) |
| H04L 29/08 | (2006.01) |
| G06F 17/22 | (2006.01) |
| G06F 9/54 | (2006.01) |

(52) U.S. Cl.
CPC ................ H04L 63/20 (2013.01); G06F 9/54 (2013.01); G06F 17/2235 (2013.01); H04L 67/02 (2013.01); H04L 67/10 (2013.01)

(58) Field of Classification Search
CPC ....... G06F 17/2235; G06F 9/54; H04L 63/20; H04L 67/02; H04L 67/10
See application file for complete search history.

(56) References Cited

U.S. PATENT DOCUMENTS

| | | |
|---|---|---|
| 7,984,170 B1 | 7/2011 | Shalla et al. |
| 8,365,061 B1 | 1/2013 | Bloom et al. |
| 2009/0276835 A1 | 11/2009 | Jackson et al. |
| 2009/0328063 A1 | 12/2009 | Corvera et al. |
| 2010/0281107 A1 | 11/2010 | Fallows et al. |
| 2011/0246772 A1 | 10/2011 | O'Connor et al. |
| 2012/0066296 A1 | 3/2012 | Appleton et al. |
| 2013/0191880 A1 | 7/2013 | Conlan et al. |

(Continued)

FOREIGN PATENT DOCUMENTS

WO    WO 2009/066233    5/2009

OTHER PUBLICATIONS

Adam Barth et al., "Securing frame communication in browsers", Communications of the ACM, vol. 53, No. 6, pp. 83-91, Jun. 2009.

(Continued)

*Primary Examiner* — Normin Abedin
(74) *Attorney, Agent, or Firm* — Leason Ellis LLP

(57) ABSTRACT

There is provided a method and apparatus of providing communication between frames of a web browser which is arranged to enforce a same origin security policy for communication between frames. The method comprises, receiving a hub document of a hub origin into a hub frame of the web browser. Receiving a first application document of a first application origin into a first application frame of the web browser, the first application origin being different to the hub origin. Communicating between the hub document and the first application document within the web browser using a cross origin communication mechanism.

18 Claims, 9 Drawing Sheets

(56) References Cited

U.S. PATENT DOCUMENTS

2013/0346873 A1 12/2013 Vasudev et al.
2014/0032597 A1* 1/2014 Ellis .................. G06F 17/30861
                                                                707/770

OTHER PUBLICATIONS

Sooel Son et al., "The Postman Always Rings Twice: Attacking and Defending postMessage in HTML5 Websites", NDSS Symposium 2013.

Architecture Journal, Issue 12, Microsoft Corporation, Jul. 2007, "Secure Cross-Domain Communication in the Browser", Danny Thorpe. Available online at: http://msdn.microsoft.com/enus/library/bb735305.aspx [Accessed Nov. 25, 2014].

Michael Mahemoffs Blog, Software As She's Developed, May 2011, "Cross-Domain Communication with IFrames", Mar. 2008 (reposted), Michael Mahemoff. Available online at: http://softwareas.com/cross-domaincommunication-with-iframes/ [Accessed Nov. 25, 2014].

* cited by examiner

COMMUNICATION BETWEEN FRAMES OF A WEB BROWSER

CROSS REFERENCE TO RELATED APPLICATIONS

This application claims the benefit of priority under 35 U.S.C. Sec. 119 of United Kingdom Application No. 1409542.6 filed May 29, 2014 which is hereby incorporated by reference as if set forth in its entirety herein.

FIELD OF THE INVENTION

The invention relates to communication between frames of a web browser, for example in web browsers which enforce a same origin security policy between frames, and in particular to communications between such frames navigated to different origins.

BACKGROUND OF THE INVENTION

Early web browsers for handling web documents, primarily documents written in HTML (Hypertext Markup Language), were designed to display and enable hyperlink functionality between content which mainly consisted of text and static images. However, with the rapid development of various Internet technologies, the handling of HTML and other web documents in web browsers has become much more complex and feature rich. For example, HTML documents now routinely include program code, for example in the form of JavaScript, JavaScript byte code, Java applets, Flash code, native executable code using systems such as PNaCl, and so forth.

It is also now routine for a single web browser session to handle multiple frames, each frame executing a different web document. When we refer to web browser frames, this includes various different ways in which such frames can be implemented, for example using multiple HTML iframes within a single window, HTML frames in separate windows, frame tags in XHTML, framesets and so forth. Also, when we refer to a frame we are including the root window of a browser session as a frame. Generally, other frames within the browser session will be children, grandchildren etc. of this root window frame.

Since each web document has an associated URI (Uniform Resource Indicator) which includes at least an Internet address from which the web document is obtained, each frame is also associated with the URI to which that frame is navigated. Sometimes, all of the frames in a web browser session might have the same Internet address or at least be from the same Internet domain, but often they will differ. A common example of differing Internet addresses or domains used within a single browser session would be in the situation of a mashup in which a parent frame includes content provided by a host server, and multiple child frames contain adverts delivered by a marketing server. In such a case, the Internet domains of the host server and the marketing server will typically be different. Other mashup examples are the inclusion of gadget frames served by third parties into a users customised home page provided by a host such as Yahoo, Google of Facebook, the provision of third party mapping functions into a business directory website, the provision of a banking payment or security check frame within a retail website, and so forth.

It is often desirable for the program code of one frame to communicate with the program code of another frame within the same browser session. However, there are also risks associated with this. For example, a malicious third party could provide program code in one frame (for example in an advertisement frame) which read a password or other sensitive data from another frame. To limit such risks, web browsers typically implement a same origin security policy which prevents, or limits the extent to which program code in one frame can communicate with another frame, if that frame is navigated to a document with a different origin.

The definition of "origin" of a document varies slightly between browsers and different implementations of same origin security policies, but typically may comprise at least the top and second level domain names and the Internet protocol type (HTTP, FTP etc.). Some browsers may consider URIs defining different third level domains, or defining different ports as being of different origins. Typically, two URIs can have different path parts mapping to a directory structure on the server, but be of the same origin.

Although mechanisms are available both formally within HTML standards and in other ways for providing cross origin communication between frames, the available technologies still make it challenging to implement, using a web browser, a graphical user interface (GUI) desktop environment which needs to use web documents from multiple origins to provide suitable integration between different tools or components of the desktop environment.

The invention seeks to address these and other problems of the related prior art.

SUMMARY OF THE INVENTION

The invention provides cross domain communication between web applications or tools executing in different frames within a browser session by providing a hub through which the applications may communicate using a cross domain communication mechanism. The hub provides a message broker service for a plurality of applications which may generally be navigated to different origins, so that each application need establish only one cross domain communication channel, with the hub.

Communication through the hub may use a subscribe and publish scheme in which applications register with the hub in respect of types of messages or actions they wish to receive. When the hub receives a message or action it then passes it to the applications which have registered for that type of message or action. Other schemes of message handling can be used.

The invention also provides techniques for managing the applications, for example by providing an application stub which provides the cross origin communication with the hub, and an auxiliary application in a child frame of the application stub which provides the main web application functionality. In some embodiments, the application stub and auxiliary application can be provided by separate instances of the same common web document.

Accordingly, the invention provides a method of providing communication between frames of a web browser which is arranged to enforce a same origin security policy for communication between frames, the method comprising: receiving a hub document from or of a hub origin, for example from a server of that origin, into a hub frame of the web browser; receiving a first application document from or of a first application origin, for example from a server of that origin, into a first application frame of the web browser, the first application origin being different to the hub origin; and communicating messages, actions or similar between the hub document and the first application document within the web browser using a cross origin communication mechanism.

The cross origin communication mechanism can be provided by a toolkit or library such as EasyXDM. A tool of a user interface or desktop can be provided directly by the first application, or by a further document executing as a child of the first application as discussed below.

The described arrangement can be used to improve control of the application document by the hub. For example, the method may further comprise the first application document trapping an event and passing the event to the hub document using the cross origin communication mechanism, and the hub document taking action in respect of the trapped event. For example if the event comprises a selection of a hyperlink within the first application document, the hub document can then block or permit navigation of a the frame of the first application document to the hyperlink, or cause another frame to navigate to the hyperlink.

The hub document can also use the cross origin communication mechanism to poll the first application document in the first application frame, and can then restart the first application document if the first application document becomes unresponsive to the poll, optionally including generating a new frame within which the restarted application is to execute.

The first application document can store one or more variables using the hub document. These variables can be stored in a variety of ways, for example using JavaScript; Flash; PNaCI etc. The variables may allow for persistence. In other words, since they are stored by the hub their values may persist even if the first application ends or is terminated.

If the first application document is restarted, the first application document may retrieve at least one of the one or more variables from the hub document, and the first application document may use the retrieved variable or variables. For example, the first application document may update (or change or otherwise modify) its own internal state (or update what it displays or process data) based on the variable. Thus it may be provided that if a first application document is restarted, the restarted first application document can restart from the same (or substantially similar) state to where it was terminated.

The above arrangements can be used with multiple applications communicating with each other via the hub in a hub and spoke arrangement. The method may therefore further comprise: receiving one or more further application documents into one or more corresponding further application frames of the web browser, each further application document being from a corresponding further application origin different than the hub origin and each other application origin; and using the cross origin communication mechanism to communicate between two or more of the application documents through the hub document.

Communication between multiple applications via the hub can take place in a variety of ways, for example using a broadcast scheme, an explicit address scheme, and/or using one or more registers of data which enable the hub to determine to which applications a message should be sent.

The other applications may also make use of the variables stored by (or at or using) the hub document. The method may therefore further comprise one of the one or more further application documents retrieving at least one of the one or more variables from the hub document, and said further application document using the at least one variable. For example, the further application document may update (or change or otherwise modify) its own internal state (or update what it displays or process data) based on the variable. The hub document may also enforce access permissions (or restrictions) on the one or more variables. These permissions may be based on any of: the class (or type or identifier) of the application document attempting access to the variable; whether the variable is being read or modified; etc.

The invention can be further used to provide control of the applications by generating an auxiliary frame, for example by action of a parent application document, receiving into the auxiliary frame an auxiliary document of the same security origin as the parent application document; and then using the cross origin communication mechanism of the parent application document to route communications between the hub document and the auxiliary application document. In particular, the auxiliary frame may be a child frame of the first application frame. In this way, the parent application document is a stub or wrapper providing a communication proxy between the hub document and the auxiliary document. The parent application document and the auxiliary document can communicate without using a cross origin mechanism because they are of the same origin.

The auxiliary document may then be used to provide the main functionality of the tool or application. This arrangement can be used to provide better control of the tool or application in various ways, for example by the parent application document monitoring or polling the auxiliary application document. If the auxiliary application document becomes compromised in some way or inactive then the first application document can restart the auxiliary document.

The first application document, executing in the first application frame, can also be used to maintain state data of the auxiliary document executing within the auxiliary frame, such that the execution of the auxiliary document can be restarted using the maintained state data. Other functionality which the application document can provide as a stub or wrapper for the auxiliary document includes providing a buffer for communications between the hub document and the auxiliary document.

Note that because the auxiliary document provides the main functionality of the user tool or user application, graphical display in the browser session window by the application document acting as a wrapper or stub will not usually be needed. To this end, commands in the application document which would render into the browser session window could be trapped so as not to execute, and/or the renderable area of the first application document could be covered with the renderable area of the auxiliary document.

The invention may also make use of the same or substantially the same web document for both the application document and the associated auxiliary document, or such documents from the same origin or having the same URI. Providing the application document and associated auxiliary document in this way is described herein as providing first and second versions or instances of a common document. The methods can then provide receiving of the first application document comprising receiving a first version of a common document into the first application frame of the web browser and the received first version of the common document determining that it is to act as the first application document; and receiving the auxiliary document comprises receiving a second version of the common document into the auxiliary frame and the received second version of the common document determining that it is to act as the auxiliary document.

The received first version of the common document may determine that it is to act as the first application document by the failure of an attempt to communicate with its parent document which is the hub document due to the same origin security policy. Similarly, the received second version of the common document may determine that it is to act as the auxiliary document by success of an attempt to communicate with its parent document, which is the first version of the common document acting as the first application document, due to the same origin security policy.

The invention also provides apparatus corresponding to the above methods and/or putting the methods into effect, for example a user terminal or other apparatus comprising a web browser implementing a same origin security policy; a hub document from a hub origin executing within a hub frame of the web browser; and a first application document, from a first application origin different to said hub origin, executing within a first application frame of the web browser, wherein the hub document and the first application document implement a cross origin communication mechanism for communication between the hub document and the first application document.

The hub and spoke configuration of hub and application documents therefore comprises this apparatus and additionally one or more further application documents executing within corresponding further application frames of the web browser, each further application document implementing the cross origin communication mechanism and being from a corresponding further application origin different than the hub origin and each other application origin, wherein the application documents are arranged to communicate between each other through the hub document using the cross origin communication mechanism.

The use of an application document as a proxy, stub or wrapper for a child auxiliary document then involves the apparatus comprising an auxiliary document, also from the first origin, executing within an auxiliary frame of the web browser, the auxiliary frame being arranged to communicate with the hub through the first application document using the cross origin communication mechanism implemented in the first application document.

The first application document and the auxiliary document may be first and second versions of a common document, the common document being arranged to determine whether it is to execute as the first application document or the auxiliary document.

The invention may thereby provide a desktop environment in which each application document corresponds to a desktop tool and provides communication with one or more others of the desktop tools via the hub document using the cross origin communication mechanism. The main functionality of each desktop tool could be provided by the corresponding application document, or if this is a stub, proxy or wrapper, by the child auxiliary document executing in a child frame of the same origin, or in other ways.

The invention also provides a computer system providing a user with a plurality of intercommunicating tools, the system comprising: a plurality of application servers each arranged to serve, from a different application origin, a different application document as set out above; a hub server arranged to serve a hub document as set out above from a hub origin different to each of the application origins; and apparatus as described herein arranged to receive said hub document and said application documents from said servers.

The invention also provides one or more computer readable media comprising computer program code arranged to put into effect the steps of any of the methods described herein, or to put into effect the described apparatus. For example, to implement the use of versions or instances of a common document to provide an application document and child auxiliary document, a computer readable medium may comprise a web document comprising computer program code such as JavaScript which is arranged to operate within a web browser implementing a same origin security policy, the web document being arranged to: detect whether of not it is executing in a first frame which is a child of a second frame navigated to the same origin as first frame; if not, then follow an execution path which establishes cross origin communication with a document executing in the second frame, which establishes an auxiliary frame, and which navigates the auxiliary frame to execute another instance or version of the web document; and if so, then follow an execution path which provides a user tool in the environment provided by the web browser, the tool being enabled to communicate with other such tools using the cross origin communication mechanism of another instance or version of the same web document executing in the second frame.

BRIEF SUMMARY OF THE DRAWINGS

Embodiments of the invention will now be described, by way of example only, with reference to the accompanying drawings of which.

DETAILED DESCRIPTION OF EMBODIMENTS

Figure 1:
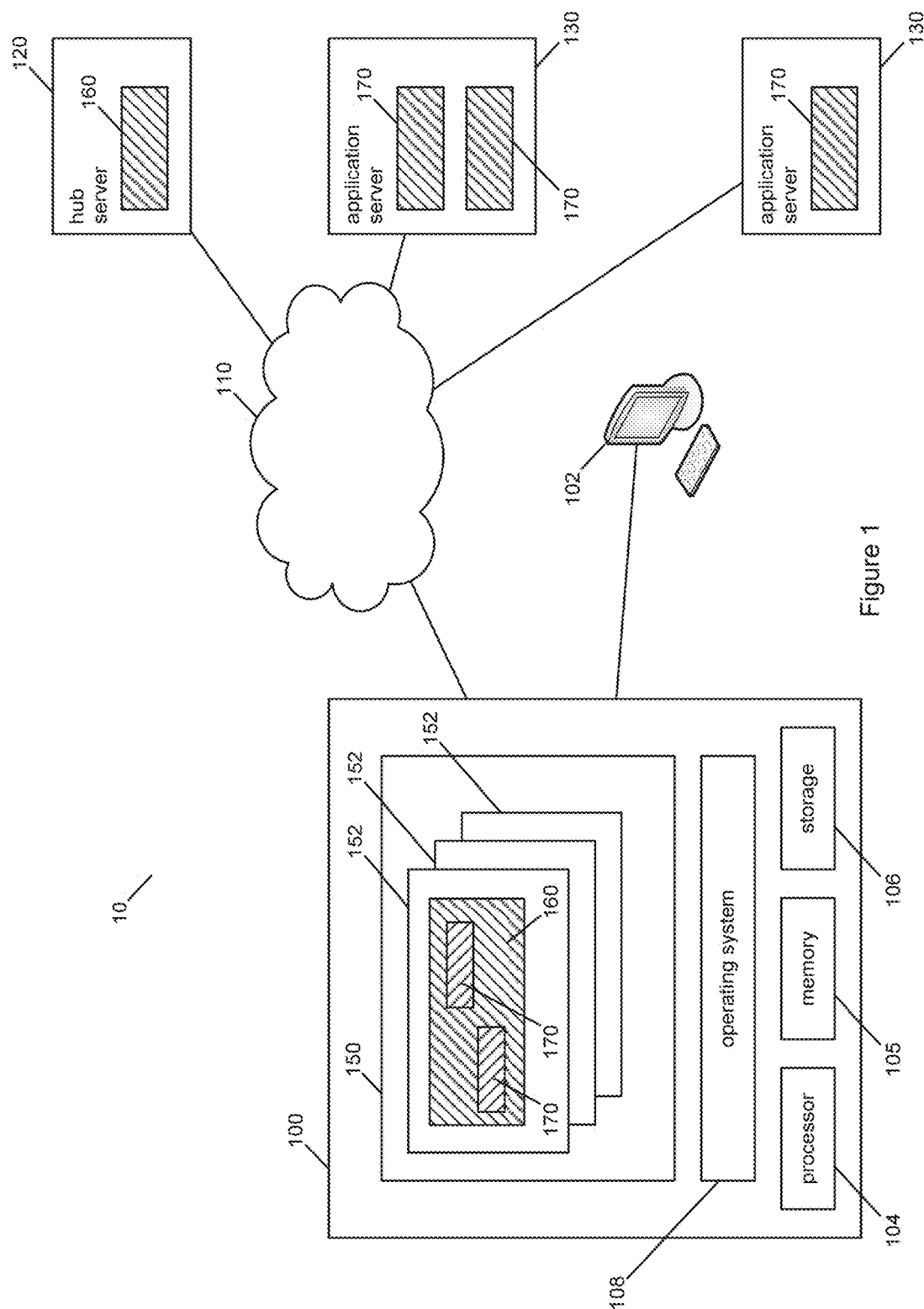
FIG. 1 shows a computer system including a user terminal connected to servers over a network for implementing the invention.

Referring now to FIG. 1 there is shown a computer system 10 in which a user terminal 100 is connected to a hub server 120 and one or more application servers 130 by a network 110, which could be or include the Internet. The user terminal 100 may typically be a personal computer provided with usual user interface facilities 102 such as a screen, keyboard and mouse, although it could be a tablet computer, a smart phone, or various other devices or combinations of devices and computer apparatus. The user terminal 100 includes a processor 104, memory 105, and typically also non-volatile storage 106, and runs application software through the use of an operating system 108.

Application software executing on the user terminal 100 includes a web browser 150. Common web browsers include Chrome, Safari, Internet Explorer and Firefox, but the skilled person will be familiar with others. The web browser will typically be capable of supporting multiple browser sessions 152, for example in tabs and/or separate windows. The web browser 150 is able to receive web documents over the network 110 and present these web documents to the user of the user terminal in the usual way. These web documents include a hub document 160 which can be downloaded from the hub server 120, and one or more application documents 170 which can be downloaded from the one or more application servers 130.

A browser session 152 of the browser receives both a hub document 160 and one or more application documents 170, and executes these within the browser session. The hub and application documents are web documents which contain program code which may typically be written in JavaScript, although other types of program code may be used, for example compiled derivatives of JavaScript (e.g. TypeScript or CoffeeScript), or Dart and so on. In some embodiments of the invention the executing hub document 160 provides a graphical user interface (GUI) desktop environment for the user of the user terminal 100, and the executing application documents 170 provide user application tools within that desktop environment. The desktop environment could be, for example, a dashboard type environment within which the tools provided by the application documents 170 are embedded. In order to improve the capabilities of the desktop environment, the hub document 160 and the application documents 170 are able to communicate with each other.

Figure 2:
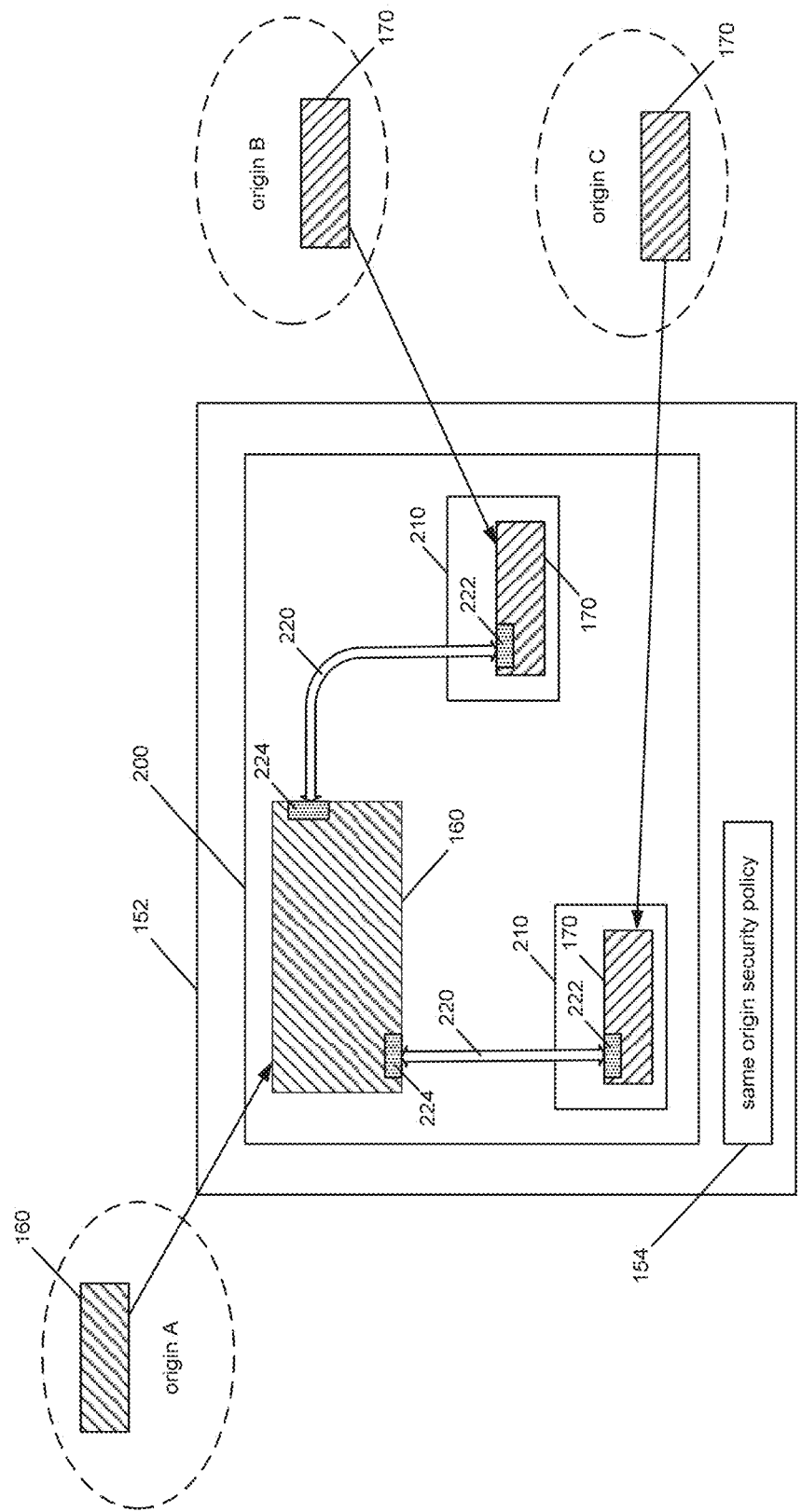
FIG. 2 shows in more detail operation of the user terminal to execute a hub document and application documents in a browser session.

FIG. 2 illustrates in more detail how the hub document 160 and application documents 170 may be loaded into and used within the browser session 152. The browser session 152 obtains the hub document from the hub server 120 using a Uniform Resource Indicator (URI) which is typically in the following well known form:

<internet protocol>//<internet address>:<port>/<path>

The browser 150 implements a same origin security policy 154. This policy determines whether two URIs are of the same "origin". The definition of "origin" of a web document varies slightly between browsers and different implementations of same origin security policies, but typically may require at least the top and second level domain names and the Internet protocol type (HTTP, FTP etc.) to be the same for two URIs to be deemed of the same origin. Some browsers may consider URIs defining different third level domains, or defining different ports as being of different origins. Typically, two URIs can have different path parts relating to directory structure on the server, but be of the same origin.

FIG. 2 therefore shows the hub document 160 as being obtained from origin A, and two application documents 170 as being loaded from two further origins B and C, where A, B and C are different origins according to the same origin security policy. The hub document 160 is loaded to and executed by a hub frame 200 of the browser session 152. The application documents 170 are each loaded to and executed by a separate application frame 210 of the browser session 152.

If the hub document 160 and the application documents 170 were of the same origin, then there would be no bar to the program code of each web document communicating with the program code of the other web documents. However, in the present case, this is communication is restricted by the same origin security policy. Each application document 210 therefore communicates with the hub document 160 using a cross-origin communication mechanism 220. The prior art provides various such mechanisms, such as the JavaScript "postMessage" construct, or the EasyXDM toolkit, provided as a library, which is a wrapper for several different methods including postMessage, fragment identifier methods and so forth (see http://easyxdm.net). Of course, the cross-origin communication mechanism 220 described herein may include one or multiple different techniques or methods, for example with different ones of the application documents communicating using any or multiple such techniques or methods, provided by one or multiple software elements.

In FIG. 2 the cross origin communication mechanism is shown as comprising cross origin communication interfaces provided at each of the hub (interface 224) and the application document (interface 222). Using the cross-origin communication mechanism 220, for example by using the respective interfaces 222,224, each application document 210 exchanges messages with the hub document 160. In certain embodiments of the invention the application documents 210 do not communicate or exchange messages with each other.

An effect of the arrangement of FIG. 2 in using a hub document and one or more application documents is that a desktop environment can be provided by a first vendor, and multiple applications or tools for use with that desktop can be provided by further vendors. The first vendor then controls provision of the hub document 160 to users, which permits interaction between multiple tools for use with the desktop which are provided by the other vendors. In FIG. 2 each of the vendors may then correspond to a different one of the origins, although of course it would be possible for more than one vendor to serve web documents from the same origin, or a single vendor to serve documents from multiple origins. The hub document 160 can be used to both provide facilities to and to control behaviour of the application documents 170. Various ways in which the arrangement of FIG. 2 can be used to facilitate communications between and to control behaviour of the application documents will now be described.

One use of the cross domain communication mechanism 220 described above can be that user related events occurring during execution of an application document 170, such as a mouse click, can be trapped by the application document 170 and sent to the hub document 160. The hub document can the process the event and either pass a message back to the application indicating what action to take; or take action itself. Either way, such action could involve doing nothing in respect of the event, i.e. inaction. Another use consequential on this is that an application frame 210 can be prevented from navigating away from the current application document 170, either by blocking that navigation or by allowing providing such navigation in another existing or new frame of the browser session.

These two uses are combined in the following example in which an application document 170 provides an instant messaging tool to the user. A received instant message is displayed in the relevant application frame 210, and includes a hyperlink sent as part of the message. When the user clicks on this hyperlink the instant messaging tool traps the mouse click event and passes it to the hub document 160. The hub document 160 can then choose to provide navigation to the link in a different frame, for example a new frame opened especially for that purpose, thereby ensuring that the application document is not replaced in the application frame by the document pointed to by the hyperlink.

Another use of the cross domain communication mechanism 220 described above can be that the hub document 160 could periodically poll an application document 210, for example at a set interval of time. This polling would consist of the hub document 160 sending a message to the application document 170 and expecting the application document 170 to send a response. If the application document does not respond then the hub document can assume that the application document has crashed or become compromised or inoperable in some way. The hub document 160 can then restart the application document. This could involve reloading the application document 170 into the application frame 210, or destroying the application frame and forming a replacement application frame 210 and reloading the application document 170 into the replacement frame 201. The application document 170 itself could be downloaded again from the relevant application server 170, or recovered from within the browser 150 or user terminal 100 in some way, for example from a local cache.

In the arrangement of FIG. 2, each application document 170 is able to communicate with the hub document 160, but typically is not configured or permitted to communicate with other application documents 170. Instead, the web documents are configured such that each application document is able or permitted to send messages to other application documents via the hub document 160, using the cross origin communication mechanism 220. Some particular ways in which this may be put into effect will now be described.

In a first example, a first application document 170 may broadcast a message to all of the other application documents 170 executing within the browser session 152, or to all of the other application documents 170 executing within frames which are subordinate to the hub frame 200. This is achieved by the first application document 170 sending a message to the hub document using the cross origin communication mechanisms, the message being labeled as a broadcast message. The hub document then sends the broadcast message to all of the other application documents 170. The message sent to the hub document may also contain an indication which determines a subset of the other application documents to which the message should be broadcast, and/or any of the application documents may indicate to the hub document whether or not they wish to receive broadcast messages, or broadcast messages with particular properties such as being broadcast by an application document with particular properties. In any case, application documents can choose to use or ignore a broadcast message as required.

Instead of or as well as using a broadcast model, an addressing model can be used for communicating between the application documents 170. A first example arrangement is that in which messages are explicitly addressed to certain recipient application documents 170. This could be done by specifying in the message one or more application documents intended to receive the message, or by specifying groups of applications by class or attribute, e.g. all accounting application tools, or all application tools from a specific vendor, intended to receive the message.

Alternatively or additionally to broadcast and addressing schemes, one or more register based arrangements can be used. In particular, a register may be maintained by the hub document. The register is used by the hub document to determine how to direct a message received from an application document. In one such arrangement a subscription based model could be used. In this scheme a message may be sent to the hub document without specifying any particular recipient(s). The hub document then would typically maintain a subscription register, and would forward a received message on to any and all application documents that have previously subscribed to messages from the sender application document. Subscriptions could also be directed towards attributes of the message, for example if the message carries a status "update" or "system control", rather than necessarily the sender of the message. Cleary various combinations of subscription and addressing models may be used, for example a subscription based model where senders could also specifically exclude or include certain applications.

It is also possible to arrange for global rules to be set which are applicable to a particular browser session 152, a particular browser 150, or to all such sessions or browsers in a particular system or implementation of the invention, or to all instances of a particular hub document 160. Such global rules may typically held as a rule register by each relevant hub document 160. For example, whitelists or blacklists, where certain application documents or classes of application document are prohibited, or explicitly allowed, to send and/or receive messages could be used. The skilled person will appreciate that there are numerous ways to arrange the messaging according to such global rules, for example ranging from a specific application document being prohibited from sending a specific type of message to another specific application document, to a certain class or type of application document being prohibited from sending messages to any other application document. These rules, along with the subscriptions, can of course be varied dynamically at runtime.

Yet another use of the cross domain communication mechanism 220 is that a given application document 170 may store one or more variables (or states or other data) by (or at or using) the hub document 160. The hub document 170 may be arranged to make such a variable available (or accessible or readable) to that application document 170. The hub document 170 may be arranged to make such a variable accessible to application documents 170 other than the given application document 170. In doing so, the hub document 160 may enforce access permissions in relation to the one or more variables. Such access permissions may be positive or negative. Such access permissions may apply to particular variables and/or particular application document 170. For example, the hub document 160 may allow or deny a particular application document 170 (and or class of application document) to modify a particular variable. The hub document 160 may allow or deny a particular application document 170 (and/or class of application documents) to read a particular variable. The skilled person would appreciate that there are many variations of such permissions.

Additionally or alternatively, one or more other application documents 170 executing within the browser session 152 may watch a given variable stored using the hub document. For example, the hub document 160 may notify (or alert or otherwise indicate to) the one or more other application documents 170 when the given variable is changed (or altered or otherwise modified). In particular, an other application document 170 may provide the hub document 160 with a function (or subroutine or fragment of code) which the hub document 160 is to call (or otherwise execute) when the given variable is changed. The hub document may prevent (or ignore or otherwise reject) a watch by a specific application document 170 on a specific variable based on the permissions described above. An application document may terminate a watch on a given variable.

The hub document 160 may store such variables using any of: JavaScript; Flash; PNaCI; etc.

It will be appreciated that storing such variables using the hub document 160 may enable one or more application documents 170 to update based on the actions of another application document 170. For example, the user may select a given entity in one application document 170. This application document may then update a variable stored by the hub document 160 with the selected entity. Another application document may then read the variable and update itself based on the user selected entity. It will also be appreciated that storing such variables using the hub document 160 may enable persistence across different instances of the same application document 170. For example, the user may select a given entity in an application document. This application document may then update a variable stored by the hub document 160 with the selected entity. The application document (and its associated application frame) may then be terminated (or its execution otherwise halted) at some point in the future. If a new application frame with the same application document is then instantiated, the application document may retrieve the variable stored by the hub document so that the application document may start with the same (or substantially the same) state as the now terminated application document. For example, an application document that has been restarted by the hub document as described above (e.g. if the application document failed to respond to a polling request) may retrieve variables stored by the application document with the hub document before the restart. The application document may then use the retrieved variables. The application document may update its display (or internal data or internal processing) based on the retrieved variables. In particular, the application document may update (or recover) a previous state relating to the application document before the restart.

By way of an example, a first application document 170 may be an "Our Customers" tool. The user may select a particular customer, say "JJ Gallagher", using the "OurCustomers" tool. The first application document 170 may then store the selected customer value as a variable with the hub document 160. The first application document 170 may then be restarted by the hub document 160 (for example due to becoming unresponsive). When restarted, the first application document 170 may retrieve the variable stored with the hub document and update its internal state. In other words the, now restarted, "OurCustomers" tool would recover from the point before the restart, with the customer "JJ Gallagher" already selected.

If another application document 170, for example relating to a "CreditControl" tool was watching (or otherwise polling) any variables stored by the hub relating to customers then when the variable set to "JJ Gallagher" by the "OurCustomers" tool, the "CreditControl" tool (by way of its application document) could update to display credit control information relevant to "JJ Gallagher". In this way the storage of variables by the hub can provide another layer of communication between individual tools.

Figure 3:
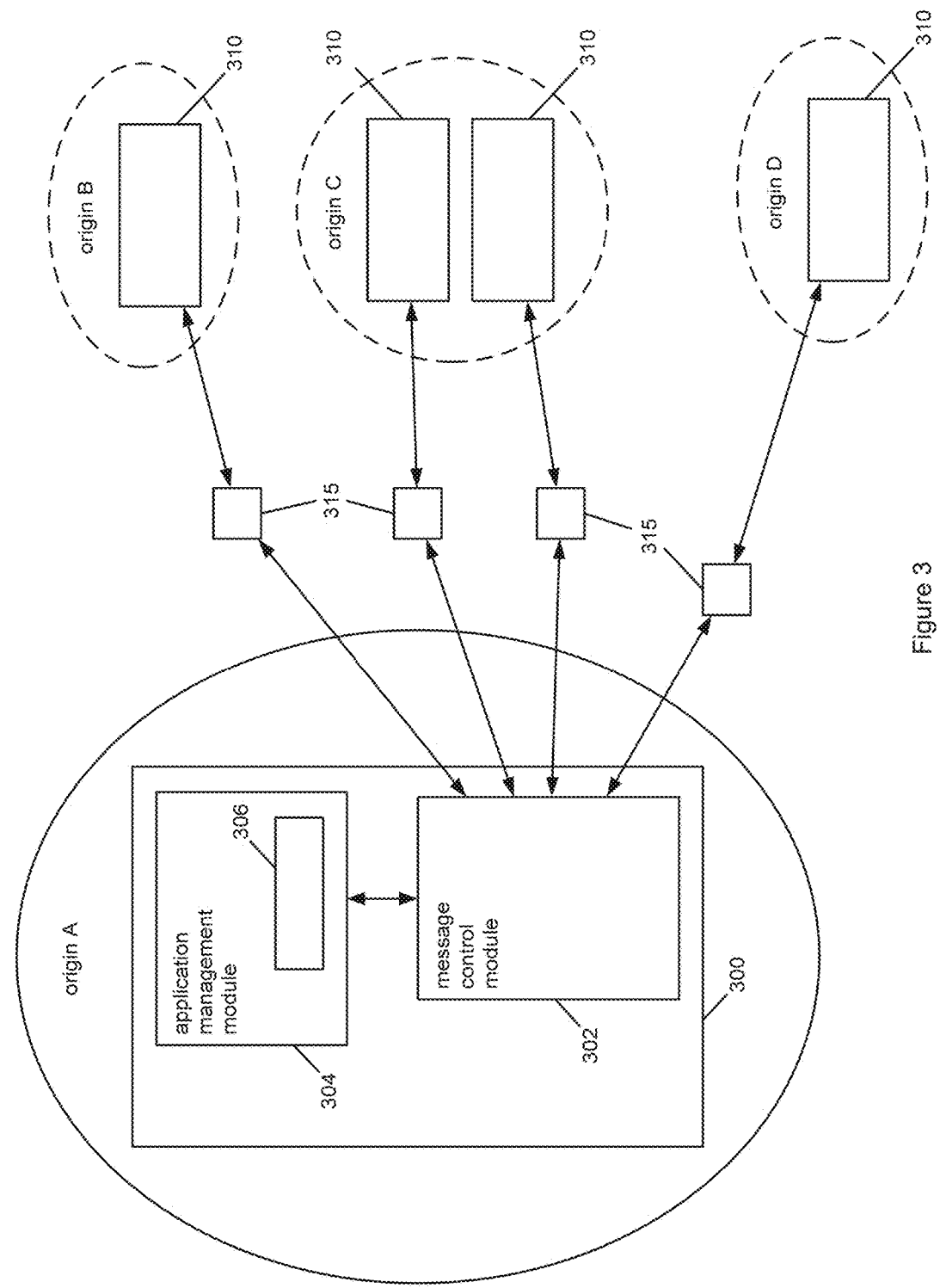
FIG. 3 illustrates communication and elements implemented in the web browser session of FIG. 2.

FIG. 3 illustrates one way in which a hub or hub functionality may be provided, for example using a hub document 160 within a hub frame 200 and a browser session 152 discussed above, to enable communication between application documents 170, and to this end the figure illustrates this method or apparatus functionality as a hub element 300. The hub element 300 includes a message control module 302 and an application management module 304, which may be implemented at least in part using the program code of a hub document 160.

Also shown are four applications 310, which may be provided by application documents 130 as discussed in connection with FIGS. 1 and 2, or to other suitable combinations of aspects of such application documents, application frames, the browser and the underlying operating system. As discussed above, the hub and the applications each have an associated origin A, B, C, D, based on the web document to which each is currently navigated, and each such origin may be different to the other origins, although it would of course be possible for one or more of the applications to have the same origin as one or more of others, or as the hub. In FIG. 3, two of the applications are associated with origin C. Each application can communicate with the hub using a cross origin communication channel 315, typically provided by a cross origin communication mechanism as already discussed above.

The hub and the applications are typically executed within a single browser session, each within a different frame, with the browser imposing a same origin security policy as discussed above.

The application management module 304 manages the hub side of the cross origin communication channels, with the actual communication being effected by the message control module 302. If the hub and the applications are implemented using hub and application web documents as discussed above, functionality of the message control module might typically comprise some relevant JavaScript code and EasyXDM socket objects.

The application management module 304 stores, in associated data storage (for example memory 105 of FIG. 1), management data 306 relating to each application 210. This management data 306 may include an identifier of a given cross origin communication channel 315 and an identifier of the application 310 associated with that channel. This is to allow the application management module 304 to be able to keep track of the currently active applications 310 and their cross-origin communication channels 315, such that the message control module 302 can pass messages to a given application 310 using the correct channel. The application management module 304 can also use the message control module 302 to send messages to perform the polling function described above whereby each application 310 is polled by the hub 300 and restarted or regenerated if a problem is detected.

The management data 306 can also include specific communication preferences for each application 310. Again these could represent subscriptions to the messages of other applications 310 or preferences regarding what types of message a particular application 310 does or does not want to receive. This depends on what type of addressing model is used for the messages in the system.

Example communication preferences stored in the management data 306 for a given application 310 could be:

(1) the application does not wish to receive any messages from a specified other application;

(2) the application wants to receive messages flagged as service messages;

(3) the application does not wish to receive any messages for a certain time interval etc.

Communication preferences may be transmitted as a request by an application 310 to the application management module 304 using the appropriate cross-origin communication channel 315 between the application and the hub 300.

In addition to storing the management data 306 about the applications and their cross-origin communication channels and the communication preferences for applications 310, the management data can also include global rules already discussed above. Some specific examples of such global rules could be:

(1) that Application B is not allowed to receive any messages that are requests for data;

(2) that application A cannot send any messages flagged as system service messages;

(3) that any messages that are sent to a specific application must also be automatically forwarded to a second specified application as well.

The message control module 302 is configured to collect messages received at the hub through the cross origin communication channels 315. It then processes these messages to determine intended or appropriate recipients, taking into account communication preferences and/or the global rules in the management data 306 stored by the application management module 304. Using the associations in the management data it re-transmits the message to the appropriate application(s) 310 via the associated cross origin communication channels.

By way of an example, presume that a first application X wishes to send a message to a second application Y. Application X first sends the message to the hub 300 using its associated cross-origin communication channel 315. The message is received at the hub 300 and passed to the message control module 302. The message control module 302 extracts from the message the identity of the intended recipient application Y. The message control module 302 then checks with the application management module 304 for any communication preferences such as global rules or subscriptions which affect or determine to which application(s) 210 the message is to be delivered for example in addition to or instead of Y, and also requests the identify of the cross-origin communication channel associated with the required recipient(s), which may or may not include Y. The message control module 302 then transmits message M to the recipient applications using the associated cross-origin communication channels 315.

A broadcast scheme can be used for messages as well as or instead of an addressing scheme. A flag or indication in a message that it is intended for broadcast may be used, although this will not be necessary if only a broadcast scheme is used. In a simple broadcast scheme, any message is broadcast to all applications 301, except the originator of the message. However, in more sophisticated broadcast schemes, the message control module 302 may construct a list of recipients from any one or more of the attributes of the message, recipients indicated in the message, and the management data 306 including communication preferences, subscription data and global rules.

By way of an example assume that an application W wishes to send a message M to all other applications in communication with the hub 300. It first transmits the message M to the hub where the message control module 302 collects extracts the intended recipient, in this case the indication that all applications are to receive the message. The message control module then looks up, using the management data 306, which other applications are present in the browser session, in this case applications X, Y and Z, and the identifiers for their associated communication channels, and then transmits message M to those recipients.

By way of a further example let us assume that, having received message M, application Y wishes to send a message R, a request for data, to all other applications on the system. However application W is the subject of a communication preference stored in the management data 306, which states that requests for data should not be sent to application W. The message transmission process proceeds as above, however when the message R is processed by the message control module 302, the list of intended recipients conflicts with the communication preferences. The message control module 302 therefore omits application W from the list of recipients to which the message is sent, which now includes only applications X and Z. Optionally the message control module can generate a further message, to notify application Y of a partial delivery failure.

In connection with communication preferences registered in the management data 306 for particular applications, these can apply on the basis of particular applications and/or more generally to types or classes of applications and/or messages. Here, a particular application may be a specific application document loaded into a specific frame, whereas an application type could refer to a specific application document when loaded into any frame, and an application class could refer to a class of application loaded into any frame. Therefore message preferences can be a specific application type (for example three application frames each having loaded application document A) or to a specific application (for example just a particular application frame within which is loaded application document A). Equally an application (or application type) can specify that it wishes to receive, ignore, etc. messages from a specific application type or only from a specific application. Additionally it should be clear that these preferences can be mixed such that an application could set a preference that it wishes to receive all update messages from a given application and wants to additionally receive all data request messages from a given application type.

Figure 4:
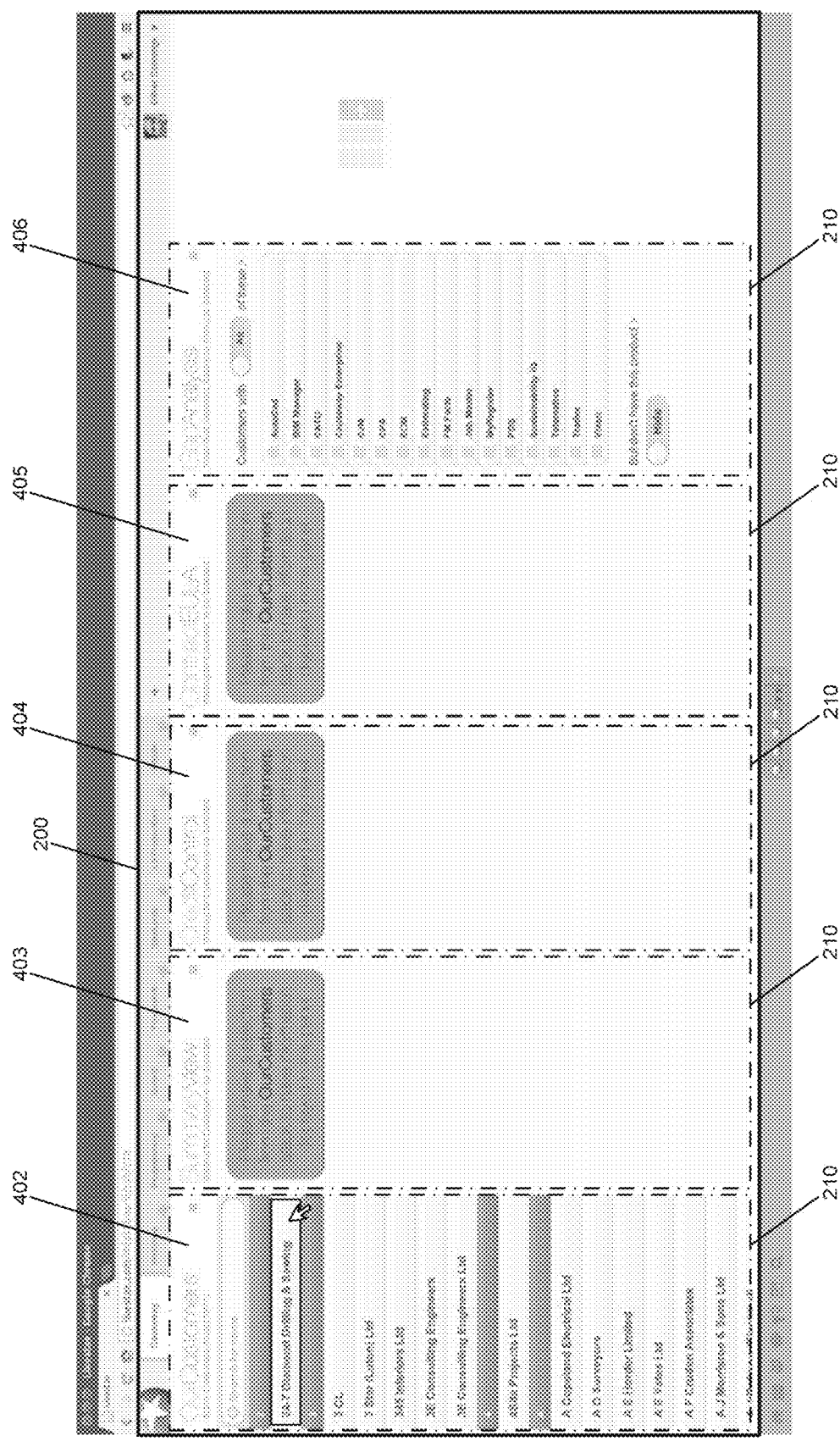
FIGS. 4 to 6 are screen shots of a GUI of a desktop environment implemented using the invention.
Figure 5:
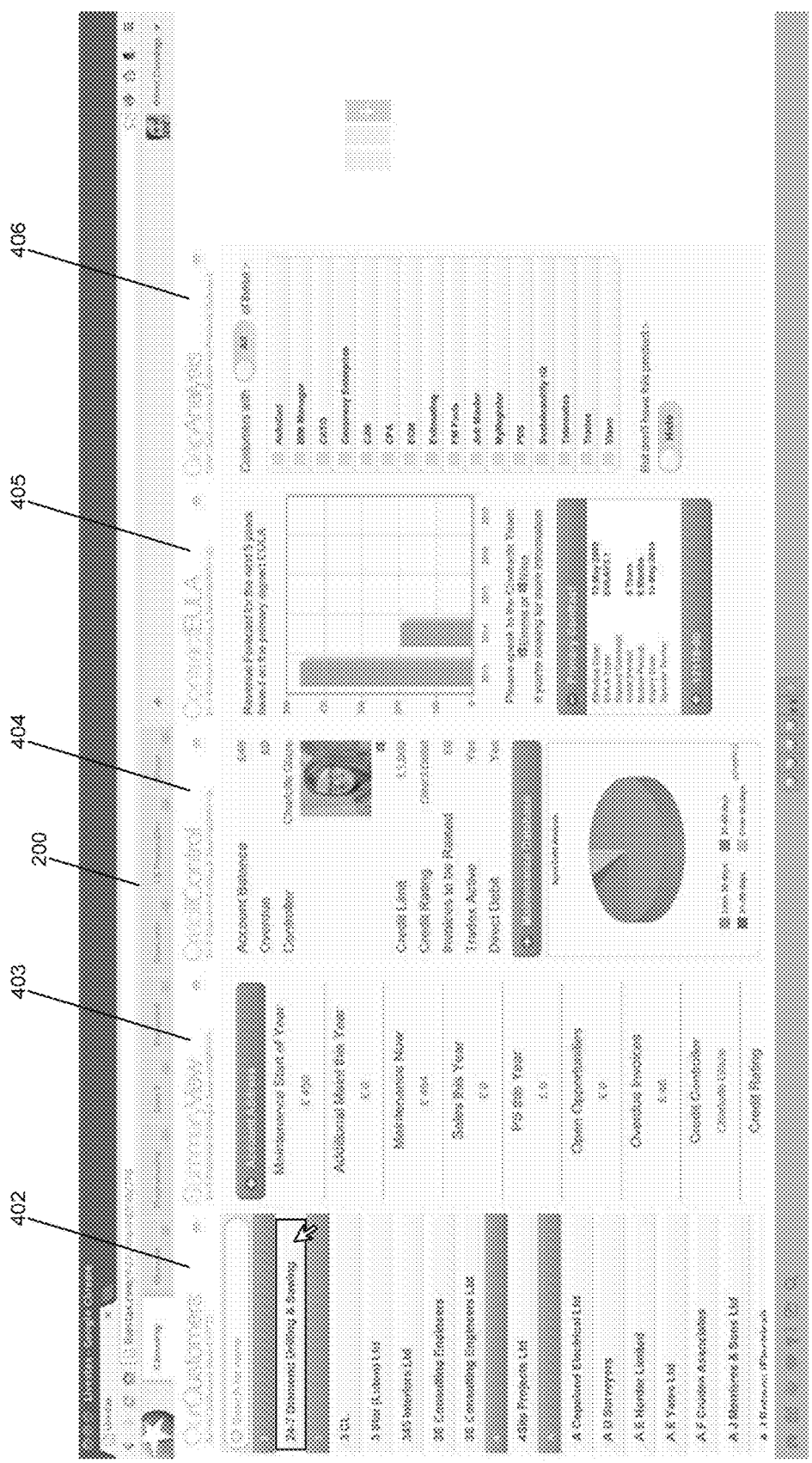
Figure 6:
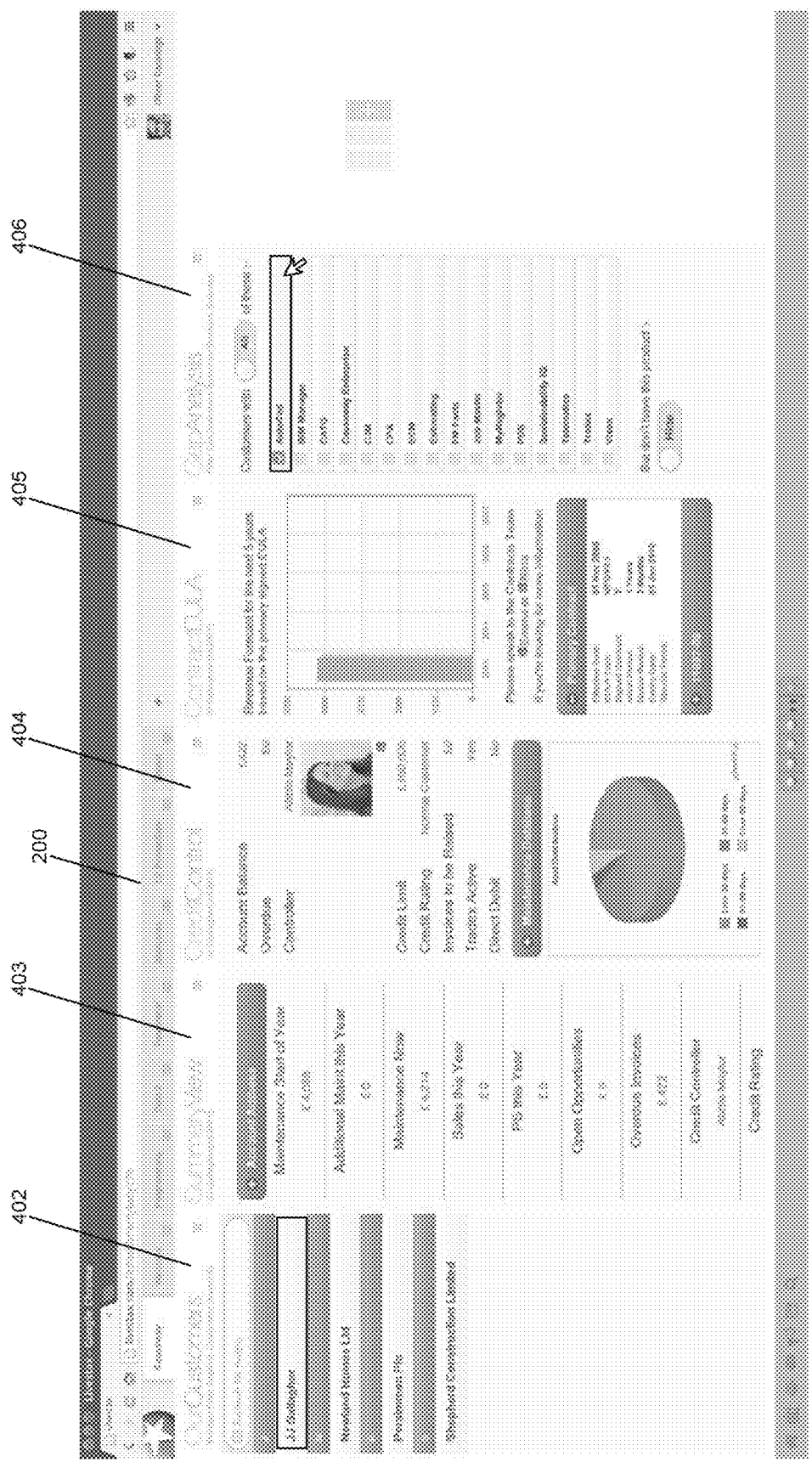

A particular example of a GUI desktop environment using the aspects discussed above will now be described. FIGS. 4, 5 and 6 show views of a desktop environment implementing the invention within a web browser 150 executing on a user terminal 100. FIG. 4 depicts a hub frame 200 provided within a tab of the Google Chrome browser, the hub frame 200 containing a plurality of (in this case five) application frames 210. Each application frame 210 is a child of, or has been spawned by the hub frame 200, in particular by the action of program code of a hub document 160 executing within the hub frame 200 to provide a hub 300 as discussed in connection with FIG. 3.

Into each application frame an application document 170 has been loaded. Each application document 170 thereby provides an application 310 or tool within the desktop environment. Each document (both application and hub) also has an associated origin, some or all of which origins are different to each other. Communications between the applications and the hub can be set up in various ways, but in the present example each application document 170 includes a JavaScript code stub which instantiates a new EasyXDM object used by that application document to provide a cross origin communication channel 315 (equivalent to mechanism 220) with the hub. The hub document 160 then includes corresponding JavaScript stubs instantiating EasyXDM objects that form the other end of these cross-origin communication channels. More JavaScript code in the hub document, when executed, performs the roles of the message control module 302, the application management module 304 and other functional aspects discussed elsewhere in this document.

FIG. 4 shows the five tools provided by the application documents as they appear when initially loaded into the respective application frames. These particular tools relate to the management of data relating customers of a business. Tools entitled "SummaryView" 403, "CreditControl" 404 and "ContractEULA" 405 have already registered with the hub 300 that they wish to listen for update messages from the "OurCustomers" tool 402. In addition the "OurCustomers" tool 402 has registered with the hub 300 that it wishes to receive messages from the "GapAnalysis" tool 406.

When a user selects a particular customer in the "OurCustomers" tool 402, the tool sends an update message to the hub. The message indicates which customer has been selected; in this example "24-7 Diamond Drilling & Sawing" has been selected. The hub then relays, using the cross origin communication mechanism, this message to each of the three tools 403, 404, 405 registered to receive update messages from "OurCustomers" tool. These tools receiving the update messages are then able to refresh their content to display information relevant to the selected customer, "24-7 Diamond Drilling & Sawing". FIG. 5 shows the result of this update activity, in which the tools entitled "SummaryView" 403, "CreditControl" 404 and "ContractEULA" 405 have been updated to provide information in respect of the customer selected in the "OurCustomers" tool.

Each tool can also send a message triggered by the receipt of another message. For example if the user now selects "AutoCad" in the "GapAnalysis" tool, the "GapAnalysis" tool then sends an update message to the hub to be broadcast to any tool listening for such messages. The hub relays this message to the only tool that is registered to receive it, the "OurCustomers" tool. This triggers the "OurCustomers" tool to refresh so that it only displays those customers having an associated "AutoCad" attribute. As the previously selected customer does not have this attribute, the "OurCustomers" tool automatically selects the topmost customer that does have this attribute. The "OurCustomers" tool then sends an update message to the hub as before, but this time indicating that "JJ Gallagher" has been selected. Again the hub relays this message to the relevant tools, and these tools now refresh to show the content relating to "JJ Gallagher". FIG. 6 shows the outcome of these steps.

The skilled person will appreciate that a variety of different tools could be provided as part of a desktop environment implementing the invention. For example, the invention could be used to implement a web portal incorporating various social media tools such as a Facebook and a Twitter tool, along with an email tool, a weather display tool and a web search tool, each tool being provided in a different frame of a browser session, each such frame executing a web page from a different origin such that a same origin security policy applies.

It was mentioned above that an application could be arranged to trap an event and pass control of how the event is to be handled to the hub by sending a corresponding message, and that this mechanism could be used to provide the hub with control of the applications, for example to prevent a user from causing an application frame to navigate away from the application web document. The option of the hub polling applications to detect their status, for example to check that they are still operative was also mentioned.

Figure 7:
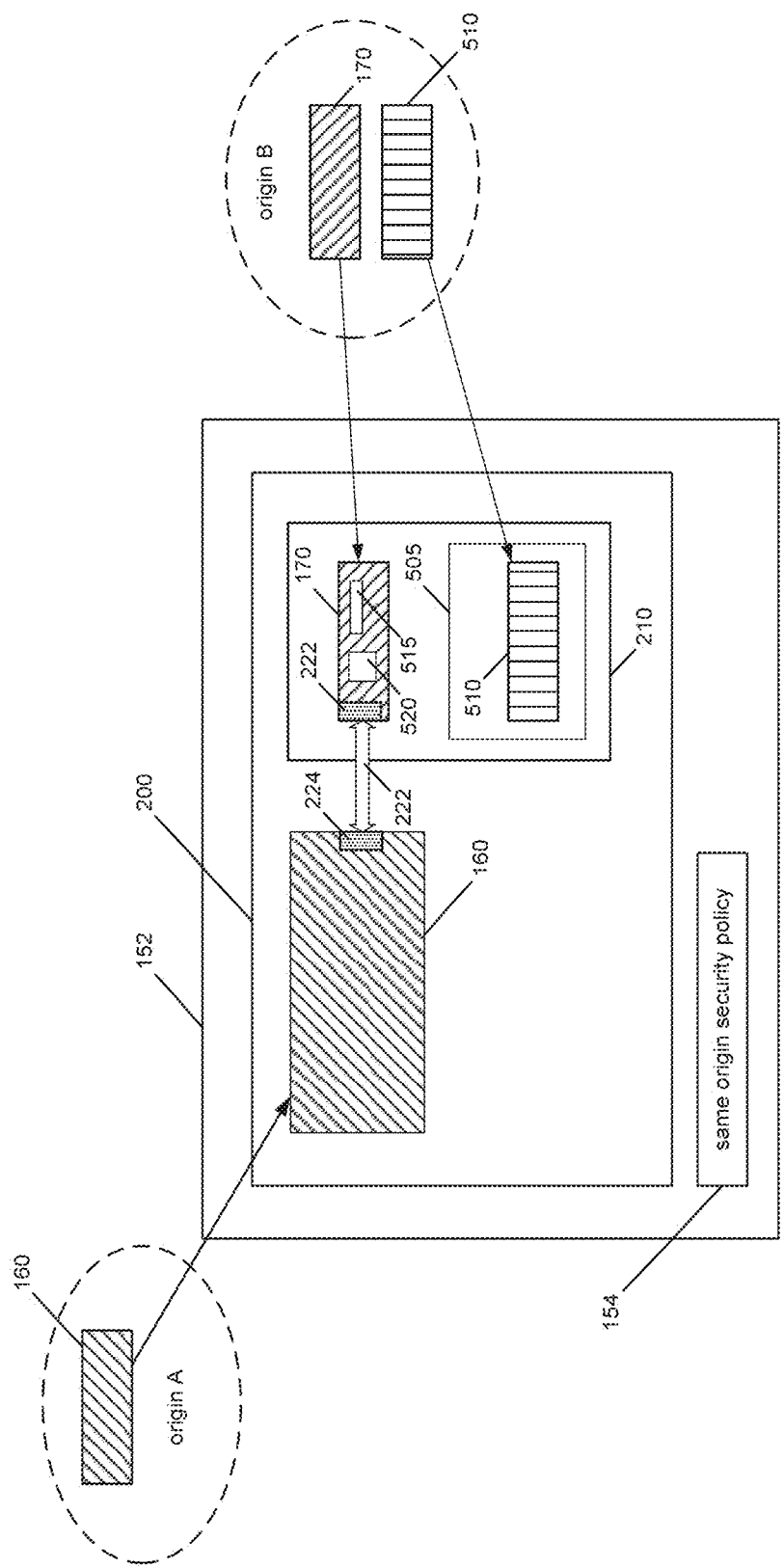
FIG. 7 illustrates a technique using an application document as a stub/communication proxy for an auxiliary document implementing a tool or application.

The applications described above can be further modified to improve the degree of control provided to the hub, and to improve resilience to crashes and malicious changes in the application documents. For example, FIG. 7 is similar to FIG. 2, but shows an arrangement in which an application frame 210 is associated with an auxiliary frame 505. Typically, the auxiliary frame 505 is nested within, and is a child of the application frame 210. Usually also, the auxiliary frame 210 is generated by an action of the application frame 201.

As before, an application document 170 is loaded into the application frame 210 for execution. Additionally, an auxiliary document 510, which is a web document containing program code as already discussed in connection with the application documents described above, and is of the same origin as the application document, is loaded into the auxiliary frame 505 for execution. Also as for FIG. 2, the application frame 210 is generated by the hub document 160 executing in the hub frame 200 within a web browser session 152.

The hub document 160 and the application document 170 are served from two different security origins A, B and therefore need to use the cross origin communication mechanism 220 to communicate, as previously discussed. However, the application document 170 and the auxiliary document 510 are of the same origin, so can communicate without requiring the cross origin communication mechanism 220.

Typically, the application document 170 of FIG. 7 acts as a stub, and the user oriented functionality of the associated tool is mainly or solely provided by the auxiliary document 510. The application document then acts as a communication proxy between the hub document 160 and the auxiliary document 510. Some or all of the state data 515 of the auxiliary document 510 as it executes may also be stored by the executing application document 170. The application document need not provide any aspect of the graphical user interface or underlying application functionality of the tool implemented by the auxiliary document, although it could do if so desired.

Instead of communicating directly with the hub document 160, the executing auxiliary document 510 passes messages to the hub document 160 using the cross-origin communication mechanism 220 available to the application document 170. This can be achieved by JavaScript in the auxiliary document 510 directly calling and accessing methods and/or objects of the first application document, although other techniques could be used such as PostMessage, JSONRPC, Flash plugins, Java Applets, Web Sockets and so on. This is possible because the application frame 210 and auxiliary frame 505 are navigated to the same origin, and the auxiliary frame 505 is a child of the application frame 210, so that the methods and data of these frames are exposed to each other. The application document 170 may therefore also be arranged to communicate with the auxiliary document 505 by directly calling and accessing methods and/or objects of the auxiliary document 505 or by similar mechanisms.

For example, the application document 170 of FIG. 7 may be arranged to poll the auxiliary document 510 periodically to check that the auxiliary document 510 is still responsive. If the auxiliary document 510 is not responsive this could possibly indicate that the auxiliary document has crashed or become inoperable in some other way. Alternatively if the executing auxiliary document (or auxiliary frame 505) were to be hijacked or otherwise compromised by an attacker, for example by being replaced with a malicious application, this would involve navigation of the auxiliary frame to a different origin so that communication between the auxiliary document and the application document would also then fail.

If the application document 170 detects a problem with the execution of the auxiliary document 510, for example by polling or some other mechanism, then it may be adapted to stop and/or restart the auxiliary document. This could be done by reloading the correct auxiliary document into the existing auxiliary frame 505, or by destroying the existing auxiliary frame 505 and creating a new auxiliary frame, into which is loaded the auxiliary document. The auxiliary document could be reloaded from a local cache or from the remote server from which is was previously obtained.

Because state data 515 of the executing auxiliary document 510 is held in or by the executing application document, i.e. in the application frame 210 and not directly in the auxiliary frame 505, it may also be possible for the auxiliary document to be restarted in a state the same as or similar to the state of the auxiliary application just before the problem leading to the restart occurred.

Additionally the executing application document 170 can include a message buffer 520. Although not shown as such in FIG. 7, this could be located in the cross origin communication interface 222 of the application document 170. The message buffer 520 buffers messages from the hub document 160 or from the auxiliary document 170 to be spooled if the respective message recipient is currently able to receive them.

For instance, upon first loading the application document into the application frame 210 the hub document 160 may immediately want to send a message that should ultimately be processed by the auxiliary document 510. Even though the application document may be fully loaded and executing within the application frame 210 and able to receive messages from the hub document, the auxiliary document may still be in the process of loading. Instead of the message being lost as undeliverable, the application document 170 can spool the message to the message buffer 520. Hence, the hub document 160 can continue its processing whilst the auxiliary document is still loading within the auxiliary frame 505. Then, when the auxiliary document has finished loading, the auxiliary document can retrieve any waiting messages from the message buffer 520 and act on them accordingly.

Similarly, if the executing auxiliary document wants to send a message to the hub document 160 while the hub document is busy, or the cross origin communication mechanism 220 is temporarily interrupted or busy, the application document 170 can spool the message to the message buffer, until it can be sent. This leaves the auxiliary document free to continue its operation and makes it appear more responsive to user interaction.

Figure 8:
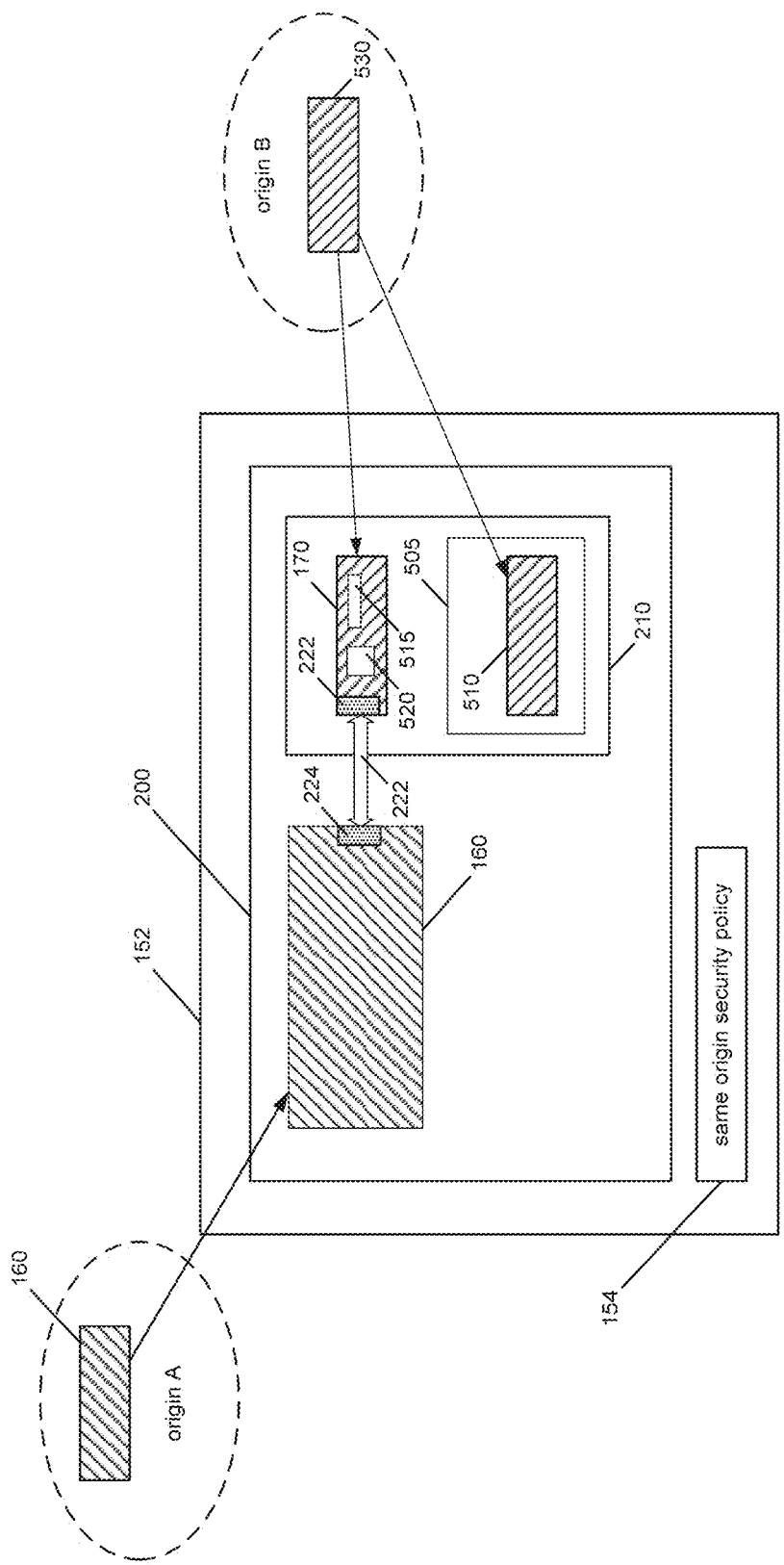
FIG. 8 shows how the technique of FIG. 7 can be implemented using a common document for both the application and auxiliary documents.

In some embodiments, the application document and the auxiliary document which is loaded by the application document into a child frame are the same or substantially the same document. For example, as illustrated in FIG. 8, which is the same as FIG. 7 in other ways, these two documents could result from navigation of the application frame and the auxiliary frame to the same URI, or the auxiliary document could be copied or created from some or all of the material within the application document. There could be some minor differences between the two documents, such as some extra program code in the application document. In some embodiments, the application document 170 is downloaded from a server, and the auxiliary document 510 is created at the user terminal from material in the application document. In other embodiments, both of the documents are downloaded separately from the server. In further embodiments the application document 170 and/or the auxiliary document 510 are generated dynamically.

For simplicity of terminology, the web document used to provide both the application document and the auxiliary document will be referred to herein as the common document 530, which is loaded twice, into two separate frames, and follows different execution paths in each frame. These two instances of the common document 530 may be referred to as first and second versions, although this does not necessarily imply that the program code of the two versions is different in any way.

Figure 9:
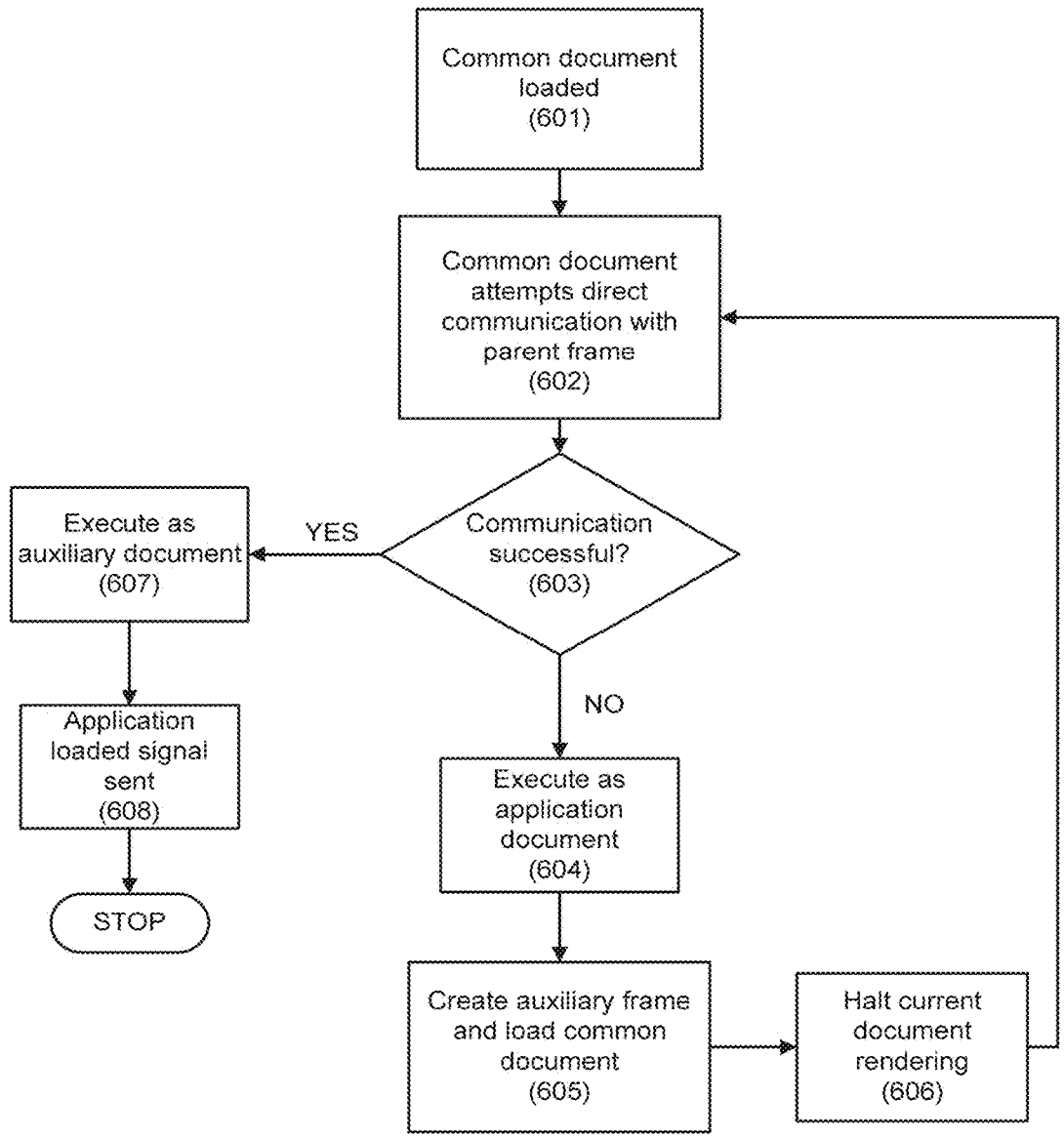
FIG. 9 illustrates a method of operation of the arrangement of FIG. 8.

FIG. 9 shows method steps which may be used in the browser session 152 to load and execute an application document and associated auxiliary document when these documents are the same or substantially the same as each other, for example being provided by a common document 530. FIG. 9 reflects that upon execution it is necessary for the common document 530 to determine whether it is to act as the application document (first version of the common document) or as the auxiliary document (second version of the common document), and to proceed accordingly.

At step 601 the executing hub document 160 creates the application frame 210 and loads the common document 530 into this frame 210. Upon execution, this first instance or version of the common document 530 then attempts to communicate directly at step 602 with the document in its parent frame, i.e. not using any cross origin communication channels or tools. In this initial case the parent frame is the hub frame and the parent document is the hub document 160.

The common document 530 then determines at step 603 whether or not the attempt at communication with the parent frame was successful. This can of course be done in many ways, such as through the use of a simple timeout condition where if the common document does not receive a reply within a certain timespan the communication is deemed to have failed. Alternatively the web browser may return an error message to the executing common document if it attempts to make an unauthorized communication. Regardless of the method used, in this first case the communication should fail because this first instance of the common document and the hub document (loaded into the parent frame) have different origins and therefore are prevented from directly communicating by the same origin security policy 154.

If the communication attempt at step 602 has failed, so that this first instance or version of the common document is now established as the application document 170, the common document proceeds with execution as the application document at step 604. This involves arranging to act as the parent for a second instance or version of the common document 530 which will act as the auxiliary document 310. This can be done simply by switching to a pre-determined portion of JavaScript or other code. This code can then go on to create instances of all of the objects required, such as the data store 515, a proxy object for mediating access between the auxiliary document instance of the common document and the application document cross origin communication interface 222 etc. Alternatively these objects could have already been created earlier and the code may simply initialize them or even just expose the relevant interfaces.

The first instance of the common document 530 acting as the application document also creates at step 605 the auxiliary frame 505 as a child of its own application frame 210, and also navigates this auxiliary frame 505 to the common document 530, which can be done in various ways as discussed above, such that the auxiliary frame is loaded with a second version of the common document 530. The auxiliary frame 505 may be rendered to exactly the same dimensions and location on the screen as the first application frame, such that whatever is rendered in the first application frame is obscured by the auxiliary frame. This is because the primary function of the tool implemented by the common document is carried out in the second instance as the auxiliary document, executing in the auxiliary frame.

The first application document then halts its own rendering (606) using an appropriate API call of the web-browser. It should no longer be rendered by the web-browser but all of the methods and objects (including the cross origin communication interface) it has already exposed remain functional and accessible to the auxiliary application.

Upon loading of the second instance of the common document 530 into the auxiliary frame at step 605, this document initially follows the same execution path as the first instance now executing as the first application. The second instance therefore attempts to establish direct communication with the document in its parent frame at step 602 which, this time, is the application frame 210. Because the second instance of the common document 530 has the same origin as the first application document this communication attempt should be successful. As before, this instance of the common document 530 tests whether the communication has been successful at step 604. and upon finding that it has, proceeds to execute as the auxiliary document. Again this can be done simply by switching to a pre-determined portion of JavaScript or other code (607).

The second instance or version of the common document 539 now executing as the auxiliary application document may now send a message to the hub at step 608, using the cross-origin communication channel of the document in its parent frame (the first instance of the common document now executing as the application document), indicating that the application loading procedure is complete.

Although some specific embodiments of the invention have been provided, the skilled person will be aware that various changes and modifications can be made without departing from the scope of the claims.

In particular, whilst some embodiments of the invention outlined above refer to the use of EasyXDM and/or the "self-injection" mechanism described herein, it will be appreciated that other mechanisms may be used. As highlighted above, the skilled person would appreciate that alternative mechanisms, such as the "postMessage" functionality of HTML5, may be used where provided for in the web browser. For example, in an embodiment using "postMessage" the respective cross origin communication interfaces 222, 224 of the hub document and the application document may comprise JavaScript event listener functions arranged to receive postMessage messages from specific security origins.

The invention claimed is:

1. A method of providing communication between a plurality of frames instantiated in a web browser which is arranged to enforce a same origin security policy for communication between frames, the method comprising:
    receiving a hub document of a hub origin into a hub frame, wherein the hub frame is one of the plurality of frames instantiated in the web browser;
    receiving a first application document of a first application origin into a first application frame, wherein the first application frame is another one of the plurality of frames instantiated in the web browser, the first application origin being different to the hub origin;
    receiving one or more further application documents into one or more corresponding further application frames, wherein each further application frame is a respective further frame of the plurality of frames instantiated in the web browser, each further application document being from a corresponding further application origin different than the hub origin and each other application origin; and
    communicating, using the cross origin communication mechanism, between the first application document in the first application frame and one or more of the further application documents in one or more of the further application frames via the hub document in the hub frame, said communicating comprising:
        the first application document sending a message to the hub document using the cross origin communication mechanism, wherein the message identifies the one or more further application documents as one or more intended recipients, and
        the hub document forwarding the message to the identified one or more intended recipients using the cross origin communication mechanism.

2. The method of claim 1 further comprising the first application document trapping an event and passing the event to the hub document using the cross origin communication mechanism, and the hub document taking action in respect of the trapped event.

3. The method of claim 2 wherein the event comprises a selection of a hyperlink, and the hub document taking action in respect of the trapped event comprises the hub document arranging for navigation of a frame to the hyperlink.

4. The method of claim 3 comprising the hub document using the cross origin communication mechanism to poll the first application document in the first application frame.

5. The method of claim 4 further comprising the hub document restarting the first application document if the first application document becomes unresponsive to the poll.

6. The method of claim 5 further comprising:
    the first application document storing one or more variables using the hub document; and subsequent to the hub document restarting the first application document:
    the first application document retrieving at least one of the one or more variables from the hub document; and
    the first application document using the at least one retrieved variable.

7. The method of claim 1 comprising the first application document sending a broadcast message to the hub document using the cross origin communication mechanism, and the hub document sending the broadcast message to a plurality of the other application documents using the cross origin communication mechanism.

8. The method of claim 1 comprising the first application document sending an addressed message to the hub document using the cross origin communication mechanism, and the hub document sending the addressed message to the one or more addressee application documents using the cross origin communication mechanism.

9. The method of claim 1 further comprising the hub document maintaining a register, and the first application document sending a message to the hub document using the cross origin communication mechanism, and the hub document sending the message to one or more recipient application documents using the cross origin communication mechanism, the recipient application documents being determined according to the register.

10. The method of claim 1 wherein each application document is one of a plurality of classes of application document, and further comprising the first application document sending a message to the hub document using the cross origin communication mechanism, and the hub document sending the message to one or more recipient application documents using the cross origin communication mechanism, the recipient application documents being determined according to class of at least one of the first application document and the one or more recipient application documents.

11. The method of claim 1 further comprising the first application document sending a message to the hub document using the cross origin communication mechanism, and the hub document sending the message to one or more identified ones of the further application documents using the cross origin communication mechanism, wherein the message is one of a plurality of message classes, the identified further application documents being identified according to a message class of the message.

12. The method of claim 1 wherein each application document implements a tool in a GUI desktop environment.

13. The method of claim 1 wherein one or more of the application documents provide administrative controls for the hub document.

14. The method according to claim 1 further comprising the first application document storing one or more variables using the hub document.

15. The method according to claim 1 further comprising:
the first application document storing one or more variables using the hub document; one of the one or more further application documents retrieving at least one of the one or more variables from the hub document; and
said further application document using the at least one retrieved variable.

16. Apparatus comprising one or more processors and a memory, the memory having stored thereon:
a web browser, executable by the processor;
a plurality of frames instantiated in the web browser, wherein the web browser is arranged to enforce a same origin security policy for communication between the frames of the plurality of frames;
a hub document from a hub origin executing within a hub frame, wherein the hub frame is one of the plurality of frames instantiated in the web browser;
a first application document, from a first application origin different to said hub origin, executing within a first application frame, wherein the first application frame is another one of the plurality of frames instantiated in the web browser, wherein the hub document and the first application document implement a cross origin communication mechanism for communication between the hub document and the first application document; and
one or more further application documents executing within corresponding further application frames, wherein each further application frame is a respective further frame of the plurality of frames instantiated in the web browser, and each further application document implementing the cross origin communication mechanism and being from a corresponding further application origin different than the hub origin and each other application origin,
wherein one of the application documents is arranged to send a message to the hub document using the cross origin communication mechanism, wherein the message identifies the one or more further application documents as one or more intended recipients, and
the hub document is arranged to forward the message to the identified one or more intended recipients using the cross origin communication mechanism.

17. The apparatus of claim 16 arranged to provide a desktop environment in which each application document corresponds to a desktop tool and provides communication with one or more others of the desktop tools via the hub document using the cross origin communication mechanism.

18. A non-transient computer readable medium comprising computer program code arranged to, when executed on a suitable computer system, put into effect the steps of:
receiving a hub document of a hub origin into a hub frame, wherein the hub frame is one of a plurality of frames instantiated in the web browser, wherein the web browser is arranged to enforce a same origin security policy for communication between the frames of the plurality of frames;
receiving a first application document of a first application origin into a first application frame, wherein the first application frame is another one of the plurality of frames instantiated in the web browser, the first application origin being different to the hub origin;
receiving one or more further application documents into one or more corresponding further application frames, wherein each further application frame is a respective further frame of the plurality of frames instantiated in the web browser, and each further application document being from a corresponding further application origin different than the hub origin and each other application origin; and
communicating between the first application document in the first application frame, and one or more of the further application documents in one or more of the further application frames via the hub document in the hub frame, said communicating comprising:
the first application document sending a message to the hub document using the cross origin communication mechanism, wherein the message identifies the one or more further application documents as one or more intended recipients, and
the hub document forwarding the message to the identified one or more intended recipients using the cross origin communication mechanism.

* * * * *